United States Patent
Al-Sharieh et al.

(10) Patent No.: US 12,373,904 B2
(45) Date of Patent: Jul. 29, 2025

(54) SYNCHRONIZED PRESENTATION OF SCHEDULED GUIDED VIEWINGS

(71) Applicant: Giraffe360 Limited, London (GB)

(72) Inventors: Ryan Al-Sharieh, Wichita, KS (US); Lauris Bricis, Plavinas (LV); Agnese Geka, Riga (LV)

(73) Assignee: Giraffe360 Limited, London (GB)

(*) Notice: Subject to any disclaimer, the term of this patent is extended or adjusted under 35 U.S.C. 154(b) by 127 days.

(21) Appl. No.: 18/082,283

(22) Filed: Dec. 15, 2022

(65) Prior Publication Data

US 2023/0385964 A1    Nov. 30, 2023

Related U.S. Application Data

(60) Provisional application No. 63/346,538, filed on May 27, 2022.

(51) Int. Cl.
| | |
|---|---|
| *G06Q 50/163* | (2024.01) |
| *G06F 3/14* | (2006.01) |
| *G06F 3/16* | (2006.01) |
| *G06T 11/00* | (2006.01) |

(52) U.S. Cl.
CPC ......... *G06Q 50/163* (2013.01); *G06F 3/1454* (2013.01); *G06F 3/16* (2013.01); *G06T 11/00* (2013.01); *G06T 2200/24* (2013.01)

(58) Field of Classification Search
CPC .. G06Q 50/16; G06Q 50/163; G06Q 10/0631; G06Q 30/02; G06Q 30/0202; G06Q 30/0241; G06Q 10/20; G06F 3/167; G06F 3/16; G06F 3/1454; G06F 3/04815; G06F 3/011; G06F 3/017; G06F 3/0482; G06F 3/0484; G06T 11/00; G06T 2200/24; G06T 19/006; G06T 19/003; G06T 7/70; G06T 17/00; G06T 19/00; G06V 20/20; G06V 40/171; G06V 40/172
See application file for complete search history.

(56) References Cited

U.S. PATENT DOCUMENTS

| | | | | |
|---|---|---|---|---|
| 10,242,400 | B1 * | 3/2019 | Eraker | G06T 19/003 |
| 2008/0086696 | A1 * | 4/2008 | Sri Prakash | G06Q 10/00 715/757 |
| 2016/0260253 | A1 * | 9/2016 | Reddy | G06T 15/205 |
| 2020/0322917 | A1 * | 10/2020 | Rosenberg | H04W 64/003 |
| 2022/0239887 | A1 * | 7/2022 | Estee | H04N 13/194 |
| 2022/0319108 | A1 * | 10/2022 | Jagannathan | G06Q 30/0641 |

* cited by examiner

*Primary Examiner* — Xilin Guo
(74) *Attorney, Agent, or Firm* — Finnegan, Henderson, Farabow, Garrett & Dunner LLP

(57) ABSTRACT

The present disclosure relates generally to systems and methods for synchronized presentation of a guided viewing. In one embodiment, a method may include accessing virtual tour data associated with a property, the virtual tour data including a plurality of images representing views within the property; receiving, from a first display device, a first video signal captured using a camera associated with the first display device; receiving, from the first display device, an indication of a navigation input reflecting a navigation through the plurality of images; and causing a guided viewing interface to be displayed on a second display device. The guided viewing interface may include a virtual tour element for displaying the plurality of images, the virtual tour element being updated to reflect the navigation input; and a video element for displaying the first video signal.

22 Claims, 12 Drawing Sheets

1000

Guided Viewing Event Scheduling

Project — 1010

[ Select Project ]

Tour

Event Name: — 1020

[ e.g., Walkthrough with Bob Smith ]

Event Date and Time: — 1030

Date — 1032
[ Wednesday, March 23, 2022 ▼ ]

Begin Time — 1034
[ 9:00 AM ▼ ]

End Time — 1036
[ 12:00 PM ▼ ]

Event Description: — 1040

[ e.g., Please join me to experience this beautiful home! ]

Link to Event: https://premium.giraffe360.com/4840waldenrd/openhouse — 1050

☐ Share event to external calendar — 1052

[ Save ] — 1060    [ Cancel ] — 1062

FIG. 10

SYNCHRONIZED PRESENTATION OF SCHEDULED GUIDED VIEWINGS

CROSS REFERENCE TO RELATED APPLICATION

This application claims the benefit of priority of U.S. Provisional Application No. 63/346,538, filed May 27, 2022. The foregoing application is incorporated herein by reference in its entirety.

BACKGROUND

Technical Field

The present disclosure relates generally to the capture, analysis, and management of data associated with a property. More specifically, the present disclosure relates to systems, methods, and devices for presenting virtual interactive walkthroughs of a property.

Background Information

Technology continues to play an increased role in communication between businesses, organizations, and individuals. For example, people increasingly rely on online meeting platforms (such as Zoom™ and Microsoft Teams™, etc.) to host and conduct virtual meetings. The real estate industry presents unique challenges for conducting meetings virtually, especially for walkthroughs of a property where exploring a physical space may be a focal point of the meeting. Indeed, existing techniques do not provide adequate platforms for conducting these types of discussions between agents and clients.

For example, some agents may conduct a walkthrough with remote clients through a video call, where the agent walks through the property while the client participates remotely. However, this requires the agent to physically travel to the property for each walkthrough of the property, which can be both time consuming and expensive for the agent. While some real estate platforms allow clients to tour a property virtually through a series of captured images, these tours are not interactive, allowing a client to ask an agent questions in real time, as would be possible in an in-person walkthrough. Some agents may schedule virtual meetings with clients through a separate online meeting platform to discuss the virtual walkthrough, however, this technique presents its own challenges. For example, this often requires one participant to view the walkthrough as a video feed (e.g., through screen sharing, etc.), which does not allow the participant to interact with the virtual walkthrough session. Further, the use of multiple platforms requires additional coordination, which can be onerous for clients and agents alike.

Accordingly, in view of these and other deficiencies in current techniques, technical solutions are needed to provide virtual interactive walkthroughs of a property. The disclosed solutions are aimed to advantageously allow agents to visit a property once to capture images and then conduct multiple virtual walkthroughs with different clients using the captured image data. Further, the disclosed solutions may provide an integrated interface allowing participants to communicate through audio and video while participating in an interactive virtual walkthrough session. Additionally, solutions may allow agents to easily schedule these virtual walkthroughs, for example by automatically syncing with the agent's and clients' calendars to book the viewing.

SUMMARY

Embodiments consistent with the present disclosure provide systems and methods for scheduling and presenting virtual interactive walkthroughs of a property.

In an embodiment, a computer-implemented method for synchronized presentation of a guided viewing may include accessing virtual tour data associated with a property, the virtual tour data including a plurality of images representing views within the property; receiving, from a first display device, a first video signal captured using a camera associated with the first display device; receiving, from the first display device, an indication of a navigation input reflecting a navigation through the plurality of images; causing a guided viewing interface to be displayed on a second display device. The guided viewing interface may include: a virtual tour element for displaying the plurality of images, the virtual tour element being updated to reflect the navigation input; and a video element for displaying the first video signal.

In an embodiment, a system for synchronized presentation of a guided viewing may include at least one processor. The at least one processor may be configured to access virtual tour data associated with a property, the virtual tour data including a plurality of images representing views within the property; receive, from a first display device, a first video signal captured using a camera associated with the first display device; receive, from the first display device, an indication of a navigation input reflecting a navigation through the plurality of images; cause a guided viewing interface to be displayed on a second display device. The guided viewing interface may include: a virtual tour element for displaying the plurality of images, the virtual tour element being updated to reflect the navigation in-put; and a video element for displaying the first video signal.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 10 illustrates an example user interface for scheduling a guided viewing event, consistent with embodiments of the present disclosure.

DETAILED DESCRIPTION

Figure 1:
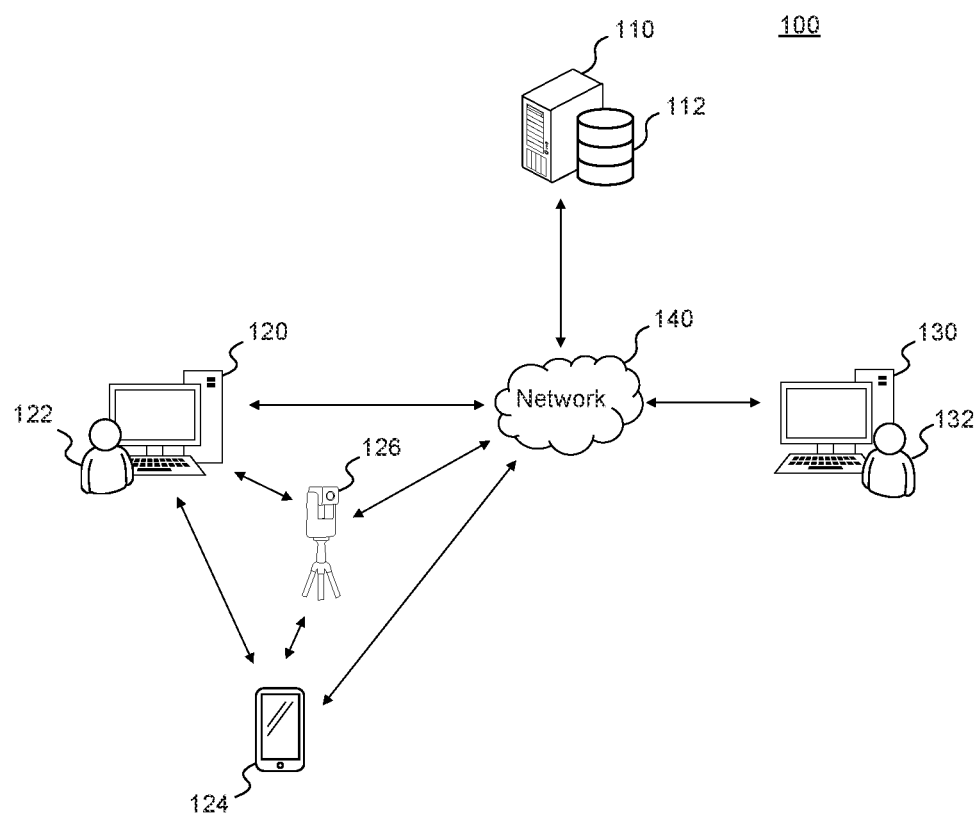
FIG. 1 is a diagrammatic representation of an example system for capturing and managing property data, consistent with embodiments of the present disclosure.

Unless specifically stated otherwise, throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include actions and/or processes of a computer that manipulate and/or transform data into other data, the data represented as physical quantities, for example such as electronic quantities, and/or the data representing physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or sequentially.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The various embodiments described herein generally relate to the capture, storage, management, analysis, sharing, and presentation of data associated with a property. As used herein, a property may refer to any form of physical asset, and may refer to a piece of land or real estate, which may include one or more buildings or other improvements or enhancements. For example, a property may refer to a residential property (e.g., single family detached home, a single family semi-detached home, a townhome, an apartment, a multi-family residential, mobile homes, etc.), a commercial property (e.g., an office space, a retail space, a hotel room, a mixed-use space, etc.), an industrial property (e.g., manufacturing facilities, warehouses, showrooms, data centers, laboratories, research facilities, etc.), land, or any other type of real estate property. In some embodiments, a property may refer to a vehicle or other form of property that may not necessarily be tied to a specific physical location. For example, a property may refer to a recreational vehicle, such as a motorhome, campervan, coach, camper trailer (e.g., fifth-wheel trailers, popup campers, and truck campers), ships, airplanes, or the like. In some embodiments, a property may include virtual spaces, such as a virtual representation of a building or a space within a virtual setting. While real estate properties are used by way of example throughout the present disclosure, one skilled in the art would recognize that a property may refer to various other objects that may be toured or inspected virtually.

Consistent with embodiments of the present disclosure, data associated with one or more properties may be collected, analyzed, and shared in various ways. In the example of real estate properties, such as homes, apartments, offices, or other buildings, this data may include images captured from within the property. For example, a user, such as a real estate agent, may capture one or more images of the property using an image capture device, as described in further detail below. These images, along with various other forms of data may be uploaded to a server, which may perform various processing operations as described herein. The data (including data having been processed by the server) may then be shared with various other entities or users, such as prospective buyers or renters of the property. The data may be presented in a manner allowing the users to interact with the data and visualize the property.

Systems consistent with some disclosed embodiments may include one or more servers configured to communicate with various computing devices or entities. As used herein, a server may be any form of computing device capable of accessing data through a network and processing the data consistent with embodiments of the present disclosure. In some embodiments, the server may include a single computing device, such as a server rack. In other embodiments, the remote server may include multiple computing devices, such as a server farm or server cluster. The remote server may also include network appliances, mobile servers, cloud-based server platforms, or any other form of central computing platform. Various example remote servers are described in greater detail below.

FIG. 1 is a diagrammatic representation of an example system 100 for capturing and managing property data, consistent with embodiments of the present disclosure. As shown in FIG. 1, system 100 may include a server 110. Server 110 may be any form of one or more computing devices for accessing data, processing data, storing data, and/or transmitting data to various other entities or computing devices. For example, this may include data associated with a property, as described above. A computing device may refer to any structure that includes at least one processor. As used herein, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

In some embodiments, server 110 may access at least one database, such as database 112. As used herein, a "database" may be construed synonymously with a "data structure" and may include any collection or arrangement of data values and relationships among them, regardless of structure. For example, a database may refer to a tangible storage device, e.g., a hard disk, used as a database, or to an intangible storage unit, e.g., an electronic database. As used herein, any data structure may constitute a database. The data contained within a data structure may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

In some embodiments, server 110 may communicate with one or more computing devices, such as computing devices 120 or 130. Computing devices 120 and 130 may include any device that may be used for performing conducting various operations associated with a data associated with a property. Accordingly, computing devices 120 or 130 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of receiving, storing, processing, or transmitting data. In some embodiments, computing devices 120 or 130 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, computing device 120 may be associated with a user 122. User 122 may include any entity associated with a property. An entity may refer to any distinct or independent existence. For example, an entity be an individual, a user, a device, an account, an application, a process, a service, a facility, a piece of equipment, an organization, or any other form of object, article or person. Alternatively or additionally, an entity may be a group of two or more components (e.g., individuals, users, devices, accounts, etc.) forming a single entity. In some embodiments, user 122 may be a real estate agent. As used herein, a real estate agent may refer to or include a professional who represents parties in real estate transactions. For example, a real estate agent may include buyers, sellers, renters, landlords, or any other parties that may be involved in a real estate transaction or contract associated with a real estate property. Alternatively or additionally, user 122 may be another entity associated with a property such as a property owner, a landlord, or any other entity that may be associated with a property. User 122 may include various other entities that may capture or upload data associated with a property, such as a photographer, a staging professional, an interior designer, an architect, a landscape designer, or the like. Accordingly, user 122 may use computing device 120 to generate, capture, process, and/or transmit data associated with a property, as described throughout the present disclosure.

In some embodiments, user 122 may be associated with various other devices, such as mobile device 124 and image capture device 126. As with computing device 120, mobile device 124 may include any device that may be used for performing or conducting various operations associated with a data associated with a property. For example, mobile device 124 may be a mobile phone or other mobile device of user 122. Additionally or alternatively, mobile device 124 may include a laptop, a tablet, a wearable device (e.g., a smart watch, smart jewelry, implantable device, fitness tracker, smart clothing, head-mounted display, etc.), or any other device that may be associated with user 122. In some embodiments, mobile device 124 may include a memory device, such as a flash drive, a solid-state drive, a hard drive, or the like. In some embodiments, mobile device 124 may not necessarily be a separate device relative to computing device 120.

Image capture device 126 may be any device capable of capturing one or more images (e.g., one or more images representative of a property or other environment), consistent with embodiments of the present disclosure. For example, image capture device 126 may be a digital camera used by user 122 to capture images of a property, which may then be uploaded to server 110. In some embodiments, image capture device 126 may include a specialized device for capturing images of buildings or other property. For example, image capture device 126 may be a rotating camera device capable of capturing and/or compiling 360-degree images of a space at various locations within a property. In some embodiments, image capture device 126 may include multiple image sensors or may include various other sensors, such as light sensors, light detection and ranging (LIDAR) sensors, radio detection and ranging (RADAR) sensors, accelerometers, global positioning system (GPS) sensors, or the like.

Computing device 130 may be similar to computing device 120 but may be remotely located relative to a property. For example, computing device 130 may be used to access data associated with a property, but may not be directly involved with the capture or upload of the data. In some embodiments, computing device 130 may be associated with a user 132, which may be a different user from user 122. In some embodiments, user 132 may use computing device 130 to communicate with computing device 120 and/or server 110, which may include accessing and interacting with data associated with the property. For example, user 132 may be a prospective buyer or renter of the property and may use computing device 130 to tour a property virtually or otherwise access data associated with the property. In some embodiments, user 132 may be referred to as an "end user" of system 100. In example embodiments where user 122 is a real estate agent, user 132 may be a client of user 122 and may access data associated with a property as part of his or her representation by user 122. Alternatively or additionally, user 122 may be a real estate agent representing a seller, and thus user 132 may not necessarily be represented by user 122. While a prospective buyer or renter is provided by way of example, user 132 may include any other entity that may be interested in viewing or accessing data associated with a property. For example, user 132 may include but is not limited to a property inspector, an appraiser, an engineer, a maintenance or repair professional, a designer, an architect, or any other entity associated with a property.

Consistent with embodiments of the present disclosure, the various components may communicate over a network 140, as shown in FIG. 1. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a near-field communications technique (e.g., Bluetooth®, infrared, etc.), or any other type of network for facilitating communications. In some embodiments, the communications may take place across two or more of these forms of networks and protocols. While system 100 is shown as a network-based environment, it is understood that the disclosed systems and methods may also be used in a localized system, with one or more of the components communicating directly with each other. For example, as shown in FIG. 1, computing device 120, mobile device 124, and image capture device 126 may be configured to communicate directly with each other (e.g., without an intermediate device), which may be in addition to or instead of direct communication with server 110. For example, in some embodiments image capture device 126 may transmit data directly to server 110 over network 140. Alternatively or additionally, image capture device 126 may transmit data over a shorter-range communication path to an intermediate device, such as computing device 120 or mobile device 124, which may transmit the data (either directly or after processing it further) to server 110.

Figure 2:
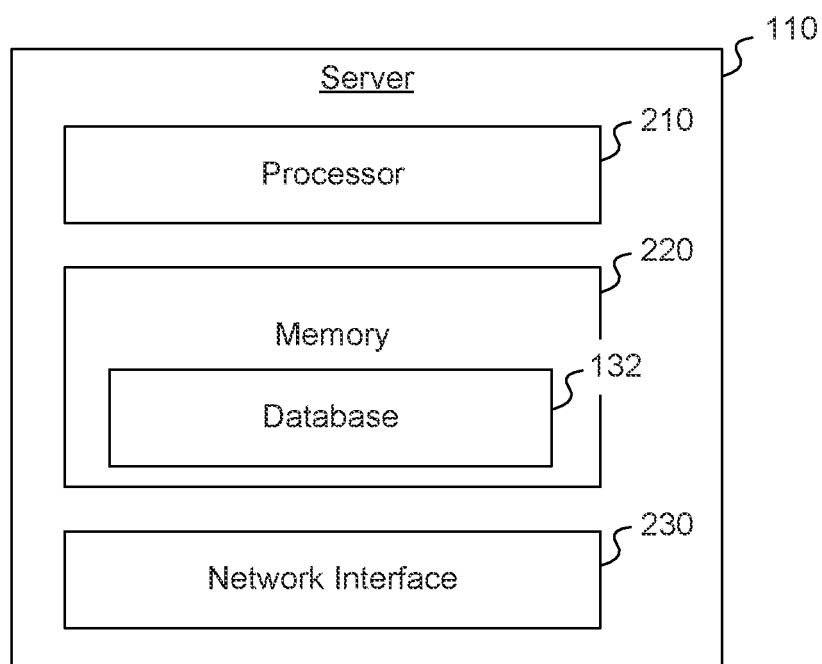
FIG. 2 is a block diagram illustrating an example server, consistent with embodiments of the present disclosure.

FIG. 2 is a block diagram illustrating an example server 110, consistent with embodiments of the present disclosure. As described above, server 110 may be a computing device and may include one or more dedicated processors and/or memories. For example, server 110 may include at least one processor, more generally referred to as processor 210, a memory (or multiple memories) 220, a network interface (or multiple network interfaces) 230, as shown in FIG. 2. As indicated above, in some embodiments, server 110 may be a rack of multiple servers. Accordingly, server 110 may include multiple instances of the example server shown in FIG. 2.

Processor 210 may take the form of, but is not limited to, a microprocessor, embedded processor, or the like, may be integrated in a system on a chip (SoC), or more take the form of any processor described earlier. Furthermore, according to some embodiments, the processor 210 may be from the family of processors manufactured by Intel®, AMD®, Qualcomm®, Apple®, NVIDIA®, or the like. Processor 210 may also be based on an ARM architecture, a mobile processor, or a graphics processing unit, etc. The disclosed embodiments are not limited to any type of processor included in server 110. In some embodiments, processor 210 may refer to multiple processors.

Memory 220 may include one or more storage devices configured to store instructions used by the processor 210 to perform functions related to the disclosed embodiments. Memory 220 may be configured to store software instructions, such as programs, that perform one or more operations when executed by the processor 210 to perform the various functions or methods described herein. The disclosed embodiments are not limited to particular software programs or devices configured to perform dedicated tasks. For example, memory 220 may store a single program, such as a user-level application, that performs the functions of the disclosed embodiments, or may include multiple software programs. Additionally, the processor 210 may in some embodiments execute one or more programs (or portions thereof) remotely located from server 110. Furthermore, the memory 220 may include one or more storage devices configured to store data for use by the programs. In some embodiments, memory 220 may include a local database 112, as described in further detail above.

Network interface 230 may include one or more network adaptors or communication devices and/or interfaces (e.g., WiFi®, Bluetooth®, RFID, NFC, RF, infrared, Ethernet, etc.) to communicate with other machines and devices, such as with other components of system 100 through network 140. For example, server 110 may use a network interface 230 to receive and transmit information associated with a property within system 100.

Figure 3A:
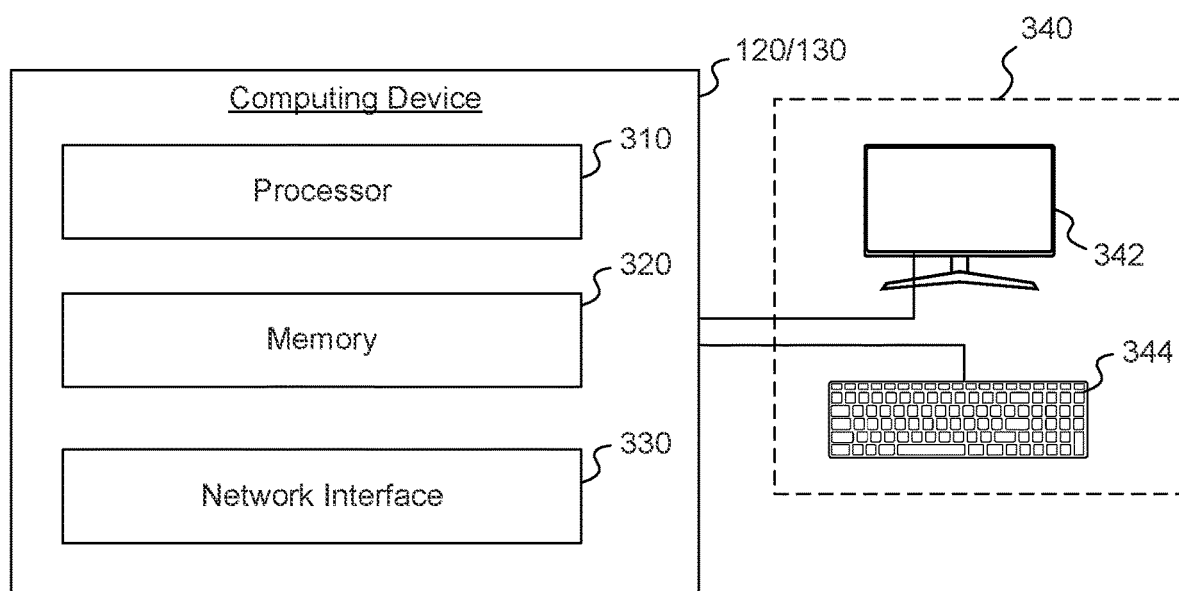
FIG. 3A is a block diagram illustrating an example computing device, consistent with embodiments of the present disclosure.

FIG. 3A is a block diagram illustrating an example computing device, consistent with embodiments of the present disclosure. Computing device 120 (or computing device 130) may include one or more dedicated processors and/or memories, similar to server 110. For example, computing device 120 may include at least one processor 310, a memory (or multiple memories) 320, a network interface (or multiple network interfaces) 330, and/or one or more input/output (I/O) devices 340, as shown in FIG. 3A. Processor 310, memory 320, and network interface 330 may be similar to processor 210, memory 220 and network interface 230, described above. Accordingly, any details, examples, or embodiments described above with respect to processor 210, memory 220 and network interface 230 may equally apply to processor 310, memory 320, and network interface 330.

For example, processor 310 may take the form of, but is not limited to, a microprocessor, embedded processor, or the like, may be integrated in a system on a chip (SoC), or more take the form of any processor described earlier. The disclosed embodiments are not limited to any type of processor included in computing device 120 and processor 310 may refer to multiple processors. Memory 320 may include one or more storage devices configured to store instructions used by the processor 310 to perform functions related to the disclosed embodiments. Memory 320 may be configured to store software instructions, such as programs, that perform one or more operations when executed by the processor 310 to perform the various functions or methods described herein. Network interface 330 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) through network 140.

I/O devices 340 may include one or more interface devices for interfacing with a user of server 110. For example, I/O devices 340 may include a display 342 configured to display various information to a user, such as user 122. In some embodiments, display 342 may be configured to present one or more graphical user interfaces to a user and may receive information through the graphical user interface. In some embodiments, I/O devices 340 may include a keyboard 344 or other device through which a user may input information. I/O devices 340 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120. Although I/O devices 340 are illustrated as external or separate components from computing device 120 by way of example, it is to be understood that computing device 120 may be defined to include I/O devices 340. In some embodiments, I/O devices 340 may be integral to computing device 120. For example, in embodiments where computing device 120 includes a mobile device such as a phone or tablet computer, I/O devices 340 may be integral to computing device 120.

Some disclosed embodiments may include presenting various user interfaces to receive information from a user. For example, this may include displaying one or more graphical user interfaces on display 342 and receiving a user input through keyboard 344 or various other forms of I/O devices. Consistent with the present disclosure, the user inputs may be used to define or provide various information, including but not limited to image data, virtual tour data, landing pages, or various other forms of information described herein.

Figure 3B:
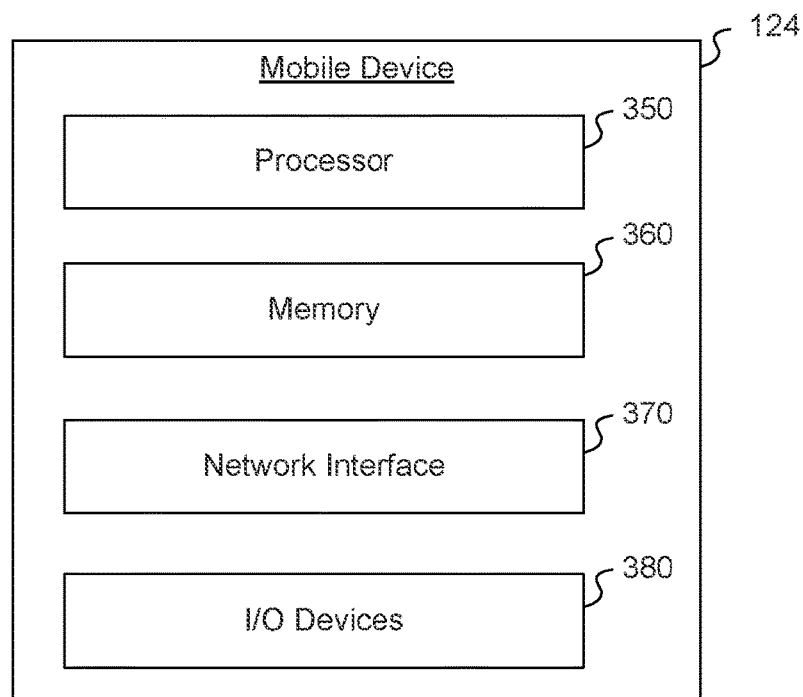
FIG. 3B is a block diagram illustrating an example mobile device, consistent with embodiments of the present disclosure.

FIG. 3B is a block diagram illustrating an example mobile device 124, consistent with embodiments of the present disclosure. Mobile device 124 may include one or more dedicated processors and/or memories, similar to server computing device 120 (or computing device 130). For example, mobile device 124 may include at least one processor 350, a memory (or multiple memories) 360, a network interface (or multiple network interfaces) 370, and/or one or more input/output (I/O) devices 370, as shown in FIG. 3B. Processor 350, memory 360, network interface 370, and I/O devices 380 may be similar to processor 310, memory 320, network interface 330, and I/O devices 340 described above. Accordingly, any details, examples, or embodiments described above with respect to processor 310, memory 320, network interface 330, and I/O devices 340 may equally apply to processor 350, memory 360, network interface 370, and I/O devices 380.

For example, processor 350 may take the form of, but is not limited to, a microprocessor, embedded processor, or the like, may be integrated in a system on a chip (SoC), or more take the form of any processor described earlier. Memory 360 may include one or more storage devices configured to store instructions used by the processor 350 to perform functions related to the disclosed embodiments. Memory 360 may be configured to store software instructions, such as programs, that perform one or more operations when executed by the processor 350 to perform the various functions or methods described herein. Network interface 370 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. I/O devices 380 may include one or more interface devices for interfacing with a user of server 110. For example, I/O devices 380 may include a display configured to display various information to a user, such as user 122. I/O devices 380 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120.

Figure 4:
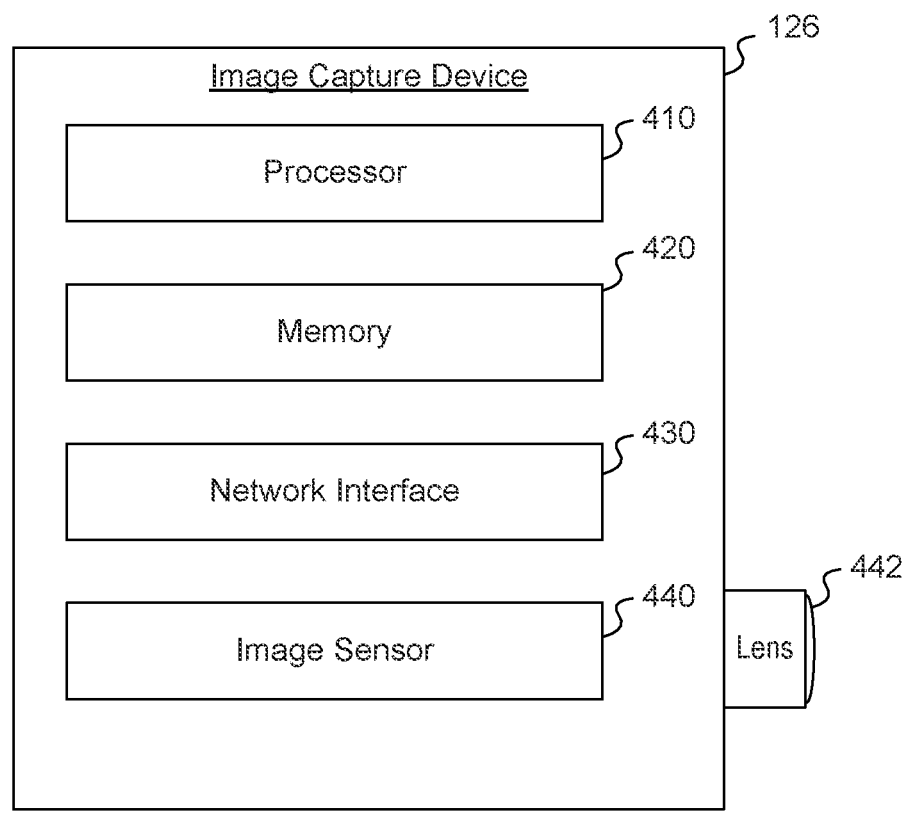
FIG. 4 is a block diagram illustrating an example image capture device, consistent with embodiments of the present disclosure.

FIG. 4 is a block diagram illustrating an example image capture device 126, consistent with embodiments of the present disclosure. Image capture device 126 may include one or more dedicated processors and/or memories, similar to computing devices 120 or 130. For example, image capture device 126 may include at least one processor 410, a memory (or multiple memories) 420, a network interface (or multiple network interfaces) 430, and/or one or more input/output (I/O) devices 340, as shown in FIG. 3A. Processor 410, memory 420, and network interface 430 may be similar to processor 310, memory 320 and network interface 330, described above. Accordingly, any details, examples, or embodiments described above with respect to processor 310, memory 320 and network interface 330 may equally apply to processor 410, memory 420, and network interface 430. For example, processor 410 may take the form of, but is not limited to, a microprocessor, embedded processor, or the like, may be integrated in a system on a chip (SoC), or more take the form of any processor described earlier.

Memory 420 may include one or more storage devices configured to store instructions used by the processor 410 to perform functions related to the disclosed embodiments. Memory 420 may be configured to store software instructions, such as programs, that perform one or more operations when executed by the processor 410 to perform the various functions or methods described herein. Network interface 430 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. In some embodiments, image capture device 126 may further include various I/O devices, similar to I/O devices 340 or 380 described above.

As shown in FIG. 4, image capture device 126 may include at least one image sensor 440 associated with at least one lens 442 for capturing image data in an associated field of view. In some configurations, image capture device 126 may include a plurality of image sensors 440 associated with a plurality of lenses 442. In other configurations, image sensor 440 may be part of a camera included in image capture device 126. Consistent with the present disclosure, image capture device 126 may include digital components that collect data from image sensor 440, transform it into an image, and store the image on a memory device 420 and/or transmit the image using network interface 430. In some embodiments, image capture device 126 may be configured to capture images from multiple directions, which may be compiled to generate a panoramic or 360-degree image. In one embodiment, image capture device 126 may be split into at least two housings such that image sensor 440 and lens 442 may be rotatable relative to one or more other components, which may be located in a separate housing. An example of this type of capturing device is described below with reference to FIG. 5. Alternatively or additionally, image capture device 126 may include multiple image sensors 440 and/or lenses 442 which may simultaneously (or near-simultaneously) capture images in multiple directions, which may be compiled into a composite image. The processing of multiple images to form a composite image may occur locally (e.g., using processor 410), or may be performed fully or at least partially by another device such as computing device 120, mobile device 124, or server 110.

Figure 5:
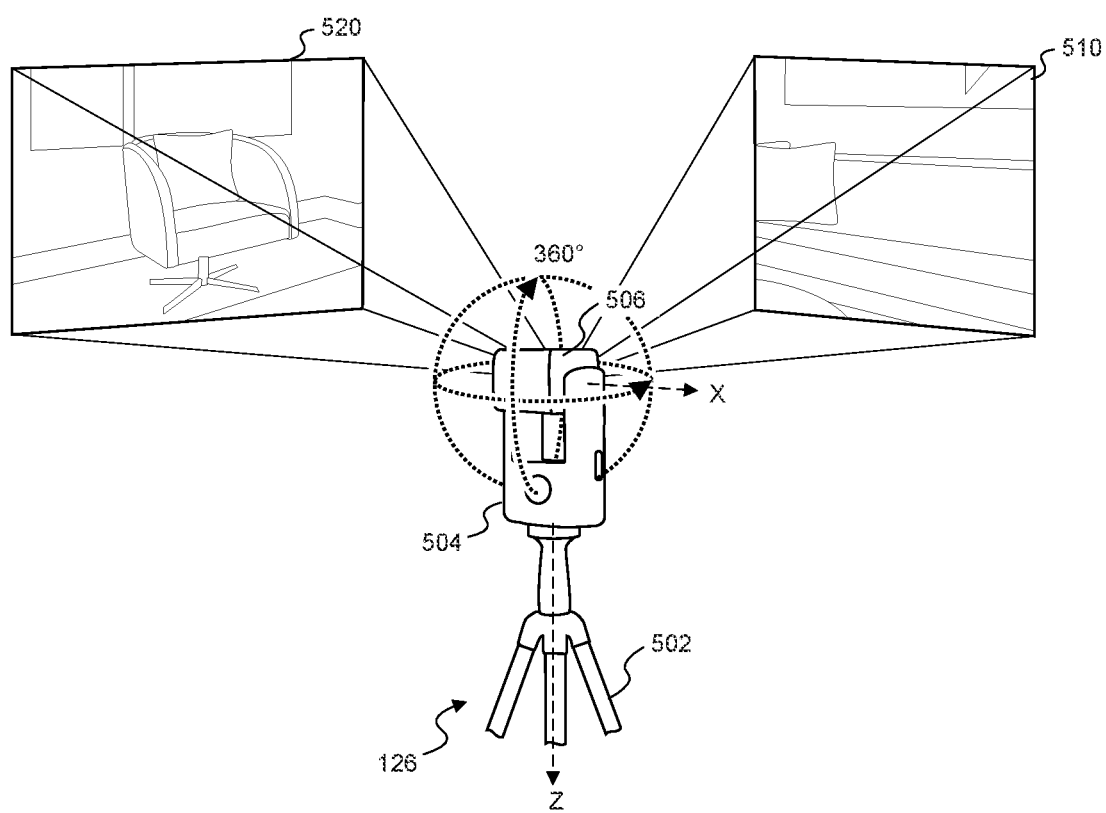
FIG. 5 illustrates an example implementation of an image capture device for capturing composite images within a space, consistent with embodiments of the present disclosure

FIG. 5 illustrates an example implementation of image capture device 126 for capturing composite images within a space, consistent with embodiments of the present disclosure. For example, image capture device 126 may be configured to capture a first image 510 in a first direction relative to image capture device 126 and a second image 520 in a second direction relative to image capture device 126. In some embodiments, image capture device 126 may capture images from different directions using a movable image sensor 440 and lens 442, as described above. For example, image capture device 126 may include a base component 502 and one or more rotatable components 504 and 506. Base component 502 may be any component configured to be at least temporarily fixed at a position within a property. For example, base component may include a tripod or other components to provide stability, as indicated in FIG. 5. Image capture device 126 may include at least one rotatable component 504, which may rotate around a vertical axis Z, as shown. This may enable image sensor 440 and lens 442 to similarly rotate around vertical axis Z, enabling image capture device 126 to capture images in 360 degrees relative to base component 502.

In some embodiments, lens 442 may be configured to allow image capture device 126 to capture sufficient image data based on the rotation of rotatable component 504 relative to base component 502. For example, lens 442 may have a wide field of view such that images 510 and 520 capture a desired portion of the surroundings of image sensor 126 without rotation of image sensor 440 and lens 442 in any additional directions. Alternatively or additionally, image capture device 126 may include an additional rotatable component 506 housing image sensor 440 and lens 442. Additional rotatable component 506 may be rotatable about a horizontal axis X to provide an additional degree of freedom for image capture device 126. Accordingly, based on the rotation of rotatable components 504 and 502 relative to each other and to base component 502, images may be captured in all directions relative to image capture device 126. In some embodiments, rotatable components 504 and 506 may be manually rotated by a user, such as user 122 to capture the surroundings of image capture device 126. For example, user 122 may manually rotate image sensor 440 and lens 442 to different orientations and capture images (e.g., image 510 and image 520) at various orientations. Alternatively or additionally, the rotation of image sensor 440 and lens 442 and/or capturing of images may be at least partially automated. For example, image capture device 126 may include one or more motors to automatically rotate rotatable components 504 and 506 to capture a desired range of the surroundings of image capture device 126. In some embodiments, user 122 may move base component 502 (and the rest of image capture device 126) to various positions within a property and image capture device 126 may automatically capture images at the specified position to generate composite image.

Images 510 and 520 (along with various other images captured in other directions relative to image capture device 126) may be combined to form one or more composite images representing the surroundings of image capture device 126. In some embodiments, a composite image may be generated by matching corresponding features in overlapping images to align the images. Accordingly, generating a composite image may include application of various feature or object detection algorithms to images 510 and 520. Alternatively or additionally, various images may be aligned using known orientations relative to image capture device 126 that images 510 and 520 were captured from. For example, based on the orientation of rotatable components 504 and 506, an orientation of images 510 and 520 may be determined, which may be used to align the images.

Figure 6:
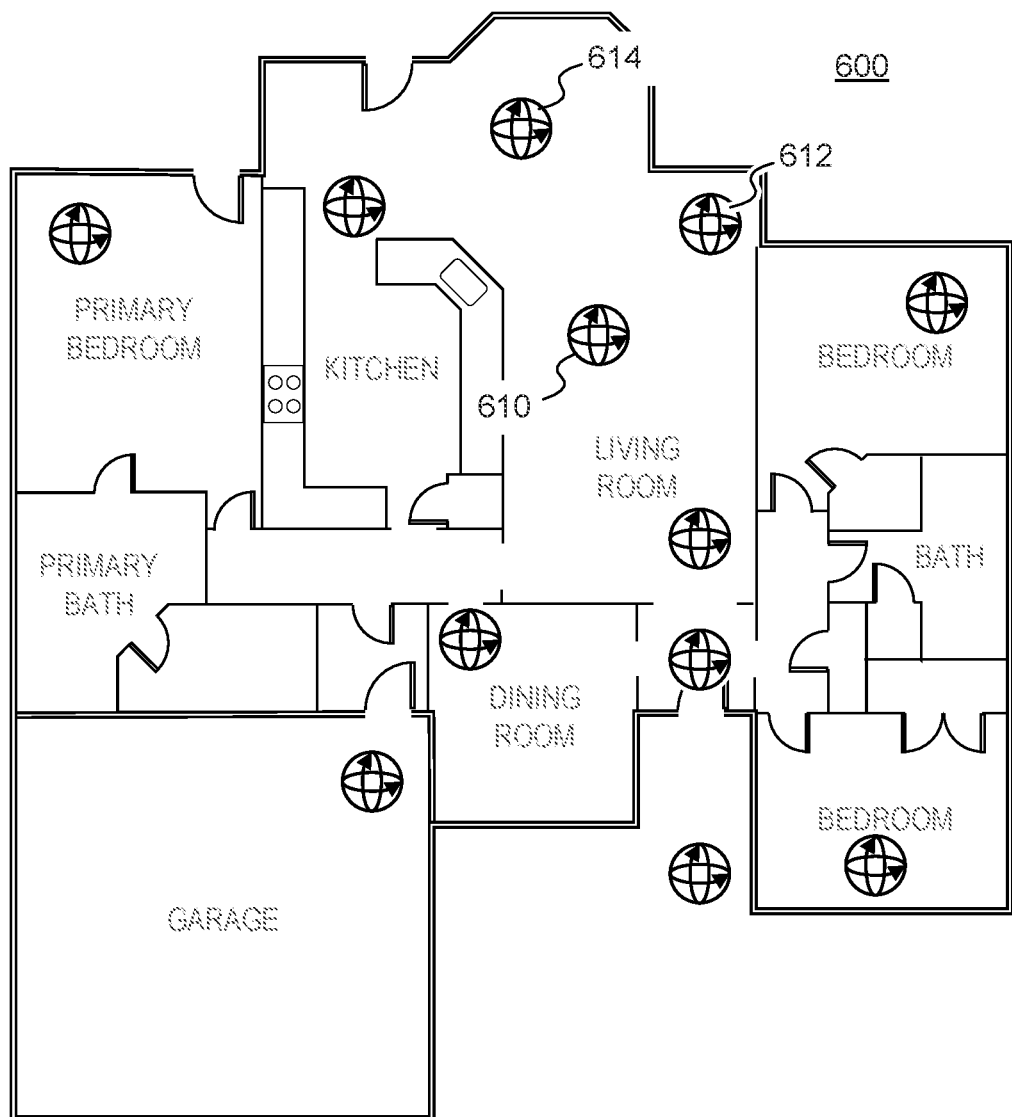
FIG. 6 illustrates an example floorplan of a property, consistent with embodiments of the present disclosure.

FIG. 6 illustrates an example floorplan of a property 600, consistent with embodiments of the present disclosure. In this example, property 600 may be a single-family dwelling such as a house. As described above, image capture device 126 may be used to capture data at various locations within property 600. In some embodiments, this may include capturing composite images representing a view of property 600 across multiple orientations. For example, image capture device 126 may be used to capture a composite image at location 610 which may include a 360 degree view of the living room of property 600. Another composite image showing at least a portion of the living room may be captured at location 612. In some embodiments, the positions of the captured images may be input (or confirmed) by a user, such as user 122. For example, user 122 may select an approximate image capture location within a floor plan when capturing a composite image using image capture device 126. Alternatively or additionally, determining or estimating the positions of locations 610 and 612 may be at least partially automated. For example, various image analysis algorithms may be used to identify features in a composite image captured at location 610, which may be compared to corresponding features appearing in a composite image captured at location 612. Accordingly, a relative position (e.g., distance, elevation, orientation, etc.) between locations 610 and 612 may be determined. This may be repeated across several other locations (e.g., location 614) to develop a map of property 600.

In some embodiments, various camera tracking techniques may be used to determine positions of locations 610, 612, and 614. For example, this may include various simultaneous localization and mapping (SLAM) techniques for camera tracking. This may include the use of various forms of sensor data, such as LIDAR sensors, inertial measurement unit (IMU) sensors, image sensors, and the like. Based on one or more of these types of sensor data, a relative position within a property may be determined. As another example, a trained machine learning model may be used to determine positions of locations 610, 612, and 614. For example, a training set of data may be input into a machine learning model, which may include known positions of composite images captured in different properties. Accordingly, a model may be trained to predict or determine positions for other sets of captured composite images. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

The composite image data and other data associated with property 600 (which may be referred to as "virtual tour data") may be uploaded to server 110. Alternatively or additionally, raw or semi-processed data may be uploaded to server 110 and the composite image data and other data may be generated by server 110. As described above, this data may be accessed and/or viewed by user 132 using computing device 130. In some embodiments, the data may be presented in the form of a virtual tour or virtual walkthrough enabling a user to navigate a simulated environment of property 600. For example, computing device 130 may display a user interface allowing user 132 to navigate between the composite images captured at locations 610, 612, and 614.

As used herein, virtual tour data may include one or more images captured at various physical locations within a property. For example, this may include image data captured at locations 610, 612 and 614 using image capture device 126, as described above. In some embodiments, the image data may include composite images such that the images cover a wider field of view than an individual image alone. For example, virtual tour data may include 360-degree images or other forms of panoramic image data captured at each waypoint location. In some embodiments, virtual tour data may include additional information, such as location data associated with the images, timestamp information, information about the property associated with virtual tour data (e.g., an address, a listing ID, a property ID, an agent associated with the property, etc.), or various other forms of data. Virtual tour data may not necessarily have been captured in a single image capture session. For example, virtual tour data may have been captured over the course of multiple days, weeks, months, or years, depending on the application. Accordingly, server 110 (or another device of system 100) may store data associated with one or more properties (e.g., in database 112), which may be supplemented as additional data is captured. In some embodiments, system 100 may allow user 122 or another user to manage data associated with a property. For example, this may include adding or removing image capture sessions, adding or removing data within an image capture session, or the like.

Figure 7:
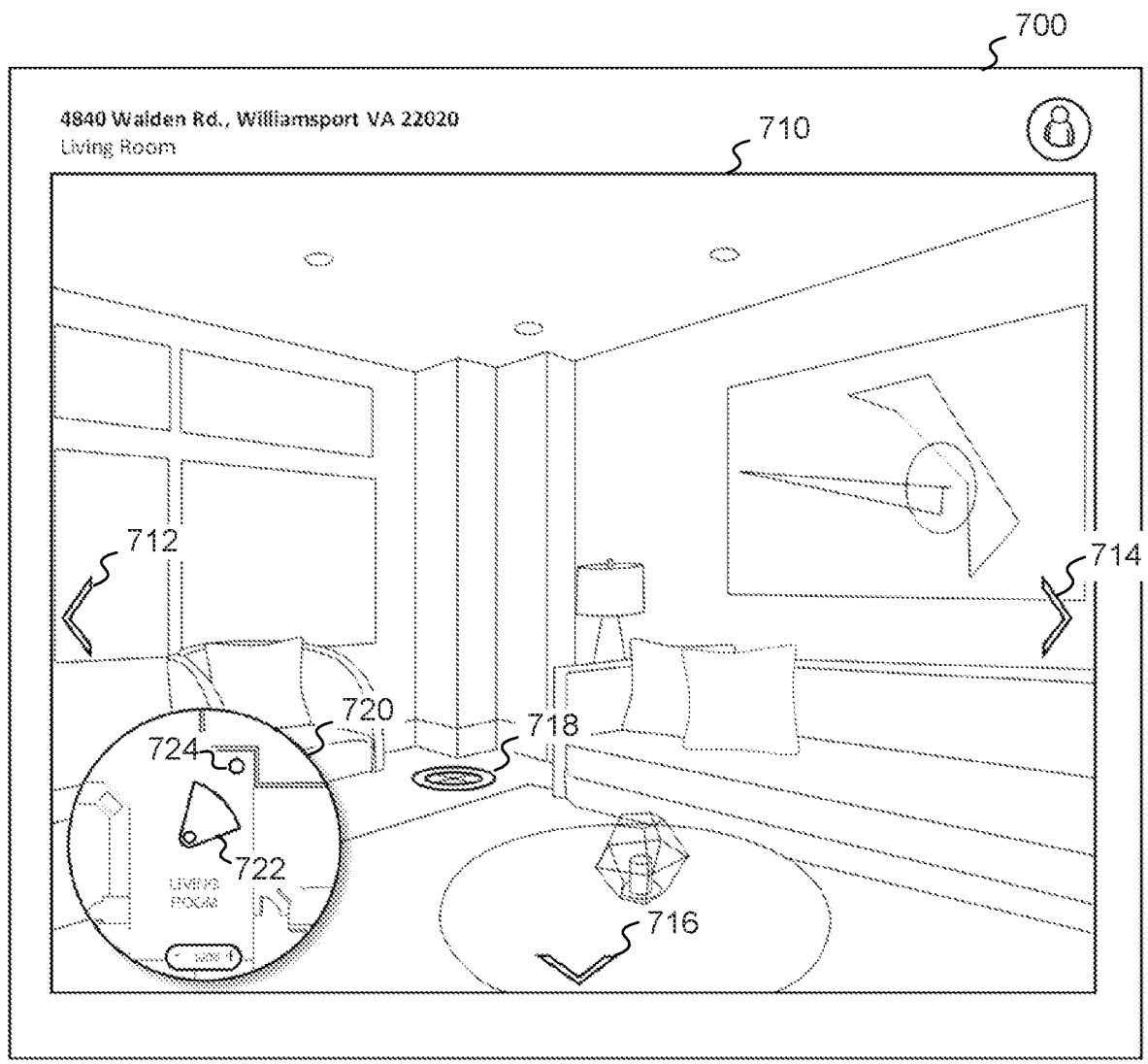
FIG. 7 illustrates an example user interface for providing a virtual tour of a property consistent with embodiments of the present disclosure.

FIG. 7 illustrates an example user interface 700 for providing a virtual tour of a property consistent with embodiments of the present disclosure. User interface 700 may be presented via a display of a display device to allow a user to view and interact with virtual tour data associated with a property. For example, user interface 700 may be presented on a display 342 of computing device 120 or 130 to allow user 122 or user 132 to view virtual tour data captured within property 600. User interface 700 may include a viewing pane 710 configured to display images of property 600. For example, viewing pane 710 may display at least a portion of a composite image captured at various locations within property 600. In the example shown in FIG. 7, viewing pane 710 may display a portion of a composite image captured at location 610, as described above.

User interface 700 may include various navigation elements 712, 714, 716, and 718, which may allow a user to update the view shown in viewing pane 710. Accordingly, user interface 700 may allow the user to navigate virtually through property 600 to simulate an actual walkthrough of property 600. For example, navigation elements 712 and 714 may allow the user to pan left or right within a composite image captured at location 610. Navigation element 716 may allow a user to move to a location behind the view currently shown in viewing pane 710. Similarly, user interface 700 may include navigation elements for moving forward to locations ahead of the current view. In some embodiments, user interface 700 may overlay navigation element 718 on an image, which may represent the position of another location the user may navigate to. For example, navigation element 718 may represent location 612 as shown in FIG. 6. Accordingly, selection of navigation element 718 may cause viewing pane 710 to show a composite image captured at location 612. In some embodiments, user interface 700 may include a zoom element, allowing a user to zoom in or out of the image shown in viewing pane 710.

In some embodiments, user interface 700 may further include a map element 720 showing a birds-eye view of property 600. Map element 720 may include a current view element 722, which may show an approximate location of current view displayed in viewing pane 710 (including position, orientation, or both). In some embodiments, map element 720 may also display navigation elements, such as navigation element 724 for moving to different locations within the property. For example, selecting navigation element 724 may cause viewing pane 710 to display a composite image captured at location 612, similar to navigation element 718. In some embodiments, user interface 700 may include a toggle button or other option to hide (or display) map element 720.

While various navigation elements are shown in FIG. 7 by way of example, one skilled in the art would recognize various other ways a user may navigate virtually through a property. For example, user interface 700 may allow a user to pan around at a particular location by clicking and dragging viewing pane 710. As another example, a user may navigate through keyboard 344 and/or another input device (e.g., a mouse, joystick, etc.). For example, the user may look around within a composite image by moving a mouse and may navigate between various locations using the arrow keys or other keys of keyboard 344. In some embodiments, viewing pane 710 may be presented within a virtual reality headset or other wearable device. Accordingly, user 132 may navigate at least partially by moving his or her head in different directions.

While various example user interfaces are provided throughout the present disclosure, it is to be understood that the various elements, layouts, and information presented therein are shown by way of example. One skilled in the art would recognize that various other forms of user interfaces may be implemented, depending on the particular application or based on individual preferences. For example, while user interface 700 is presented as a viewing pane with navigational elements overlayed on the image, one skilled in the art would recognize that similar information may be acquired through various other user interface layouts and controls. Accordingly, any of the various user interfaces presented herein may include various forms of buttons, text input fields, radio buttons, checkboxes, dropdown lists or menus, links, breadcrumbs, timelines, tabs, links, tree panes, menus, accordion controls, icons, tooltips, alerts, pop-ups, touchscreen interfaces, or any other form of element for inputting and/or displaying information.

In some embodiments, the various techniques described herein may include application of one or more trained machine learning algorithms. These machine learning algorithms (also referred to as machine learning models in the present disclosure) may be trained using training examples to perform particular functions (including both supervised and/or unsupervised), as described more specifically in the various examples herein. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs.

Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters. For example, the hyper parameters may be set automatically by a process external to the machine learning algorithm (such as a hyper parameter search algorithm), and the parameters of the machine learning algorithm may be set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short-term memory artificial neural networks, and so forth. In some examples, an artificial neural network may be configured by a user. For example, a structure of the artificial neural network, a type of an artificial neuron of the artificial neural network, a parameter of the artificial neural network (such as a parameter of an artificial neuron of the artificial neural network), and so forth may be selected by a user. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein) may include analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the following are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example, by the methods, steps and modules described herein) may include analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model pre-programmed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Platform for Scheduled Guided Viewings

As described above, the disclosed embodiments may allow a user, such as user 132 to engage in a virtual tour of a property. For example, user 132 may navigate virtually through a property by viewing images captured from within the property at various locations. An example graphical user interface for a virtual tour is illustrated in FIG. 7 and described in further detail above. In some embodiments, the disclosed systems and methods may allow for collaborative or coordinated virtual tours, in which two or more separate entities can engage in an interactive walkthrough of a property. The system may provide an improved user interface allowing interaction with the virtual tour by multiple entities while facilitating discussion between the entities.

For example, system 100 may allow users to access the virtual event remotely through their respective computing devices using generated links. The guided viewing event may provide an interface allowing users to view and participate in a virtual walkthrough. In particular, the virtual walkthrough may be an interactive element within the interface, allowing a user to navigate through images of a property. The images may be presented in a manner that simulates the user physically walking through the property. Notably, the interface may allow both participants to control or interact with the virtual walkthrough element. For example, an agent may initially control the guided walkthrough and the client may take control (or request control) to ask a question about a particular feature in the property, navigate to another area of the property, or the like. The interface may further include video elements allowing participants to view and/or hear each other in real time. Presenting the guided walkthrough and the video elements within the same interface may reduce the burden on participants of the guided viewing event. For example, this may eliminate the need to launch a meeting in one platform and then navigate to a separate platform to view the property. Further, this may allow all participants to interact with the same virtual walkthrough, which may facilitate the discussion. In some embodiments, the system may also provide an interface for generating appointments for the scheduled guided viewings. Accordingly, the disclosed embodiments provide an improved system for scheduling and conducting coordinated virtual tours of a property. The disclosed embodiments thus provide improved efficiency, convenience, and performance over conventional virtual tour or online collaboration tools.

Figure 8:
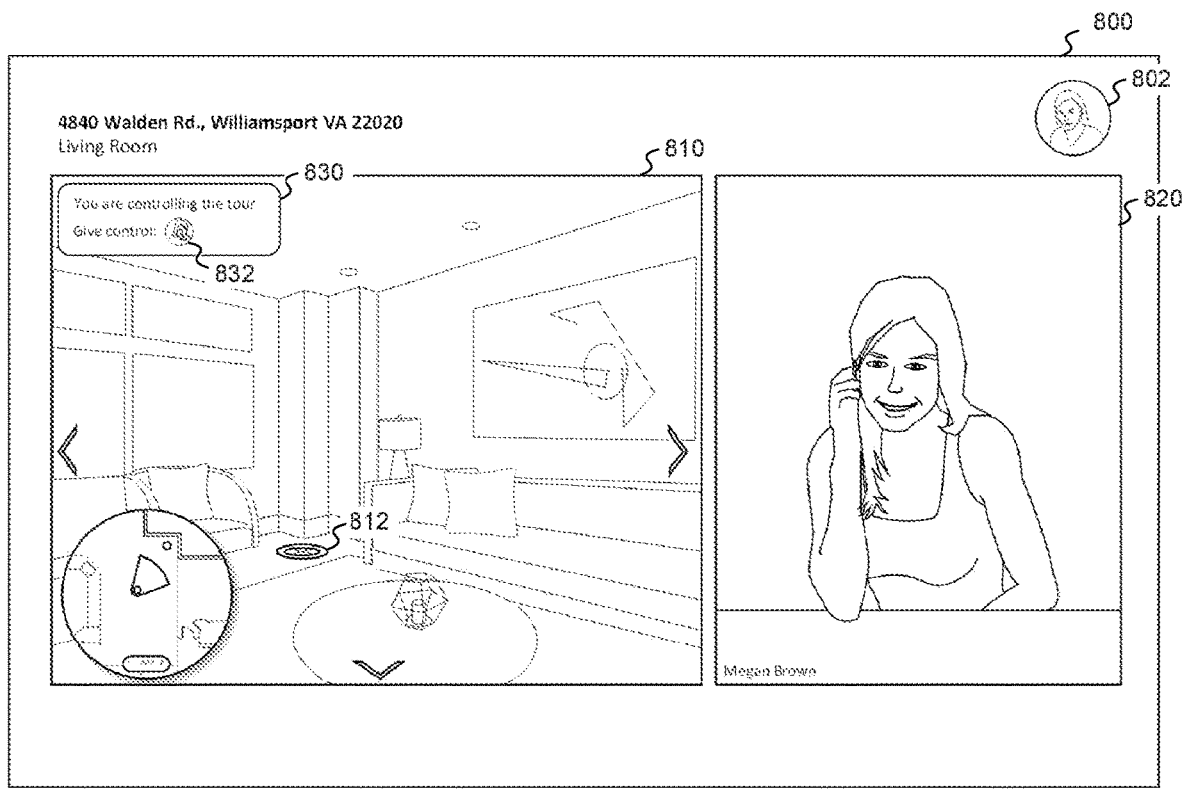
FIG. 8 illustrates an example interface for conducting a guided viewing of a virtual tour, consistent with embodiments of the present disclosure.

FIG. 8 illustrates an example interface 800 for conducting a guided viewing of a virtual tour, consistent with embodiments of the present disclosure. User interface 800 may be similar to user interface 700 described above, but may be tailored to allow collaboration and communication between multiple participants, as described herein. Accordingly, any of the various embodiments or features described above with respect to user interface 700 may equally apply to user interface 800. For example, user interface 800 may include viewing pane 810 (which may also be referred to as a virtual tour element) for displaying a particular view within a property, similar to viewing pane 710. User interface 800 may also include a video element or pane 820 for displaying a video of another user. Accordingly, user interface 800 may allow a user to simultaneously view and/or navigate virtually through a property and communicate with another user within an integrated interface.

User interface 800 may be displayed on a first display device associated with a first user. For example, user interface 800 may be displayed on computing device 120 and may be presented to user 122. User interface 800 may include an account element 802 indicating which user is signed in and viewing user interface 800. In this example, user 122 may be an agent providing a guided virtual tour to another user, such as user 132. Accordingly, a video pane 820 may display a video captured using a camera of computing device 130, which may include a series of images of user 132. Alternatively or additionally, computing device 120 may present an audio signal including a voice of user 132. The captured video and/or audio data may be presented in real-time (or near real-time) to allow user 122 to see and communicate with user 132. A similar user interface 900, described in further detail below, may be displayed on computing device 130, which may allow user 132 to view the virtual tour and a video of user 122.

User interface 800 may allow user 122 to navigate virtually through a property, similar to user interface 700 described above. For example, user interface 800 may include a navigation element 812 (which may correspond to navigation element 718 described above) to allow user 122 to change the view displayed in viewing pane 810 and to simulate or approximate physical navigation through a property. Although not labeled in FIG. 8, user interface 800 may include various other navigation elements, including navigation elements 712, 714, 716, and 724 described above. In some embodiments, user interface 800 may also include a control element 830, described in further detail below, allowing user 122 to share control of viewing pane 810 with user 132.

Figure 9:
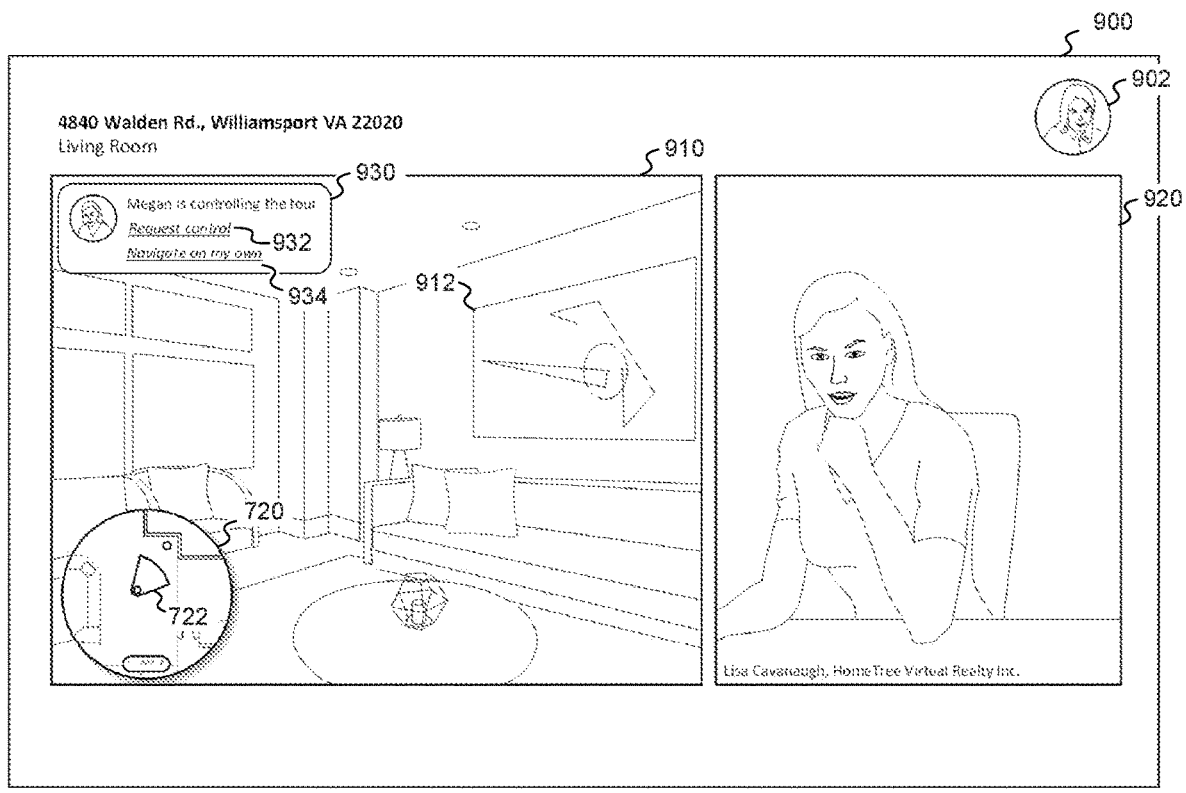
FIG. 9 illustrates another example user interface for conducting a guided viewing of a virtual tour, consistent with embodiments of the present disclosure.

As indicated above, a similar user interface may be presented to other users, allowing them to view and/or interact with the coordinated virtual tour. FIG. 9 illustrates another example user interface 900 for conducting a guided viewing of a virtual tour, consistent with embodiments of the present disclosure. User interface 900 may be the same as or similar to user interface 800, but may be displayed on a second computing device and may be viewed by a second user. In this example, user interface 900 may be displayed on computing device 130 and may be viewed by user 132, as indicated by account element 902. User interface 900 may include viewing pane 910 (which may also be referred to as a virtual tour element) for displaying a particular view within a property, similar to viewing panes 710 and/or 810 described above. User interface 900 may also include a video element or pane 920, which may be the same as or similar to video pane 820 described above. In this example, video pane 920 may display a video captured using a camera of computing device 120, which may include a series of images of user 122. Alternatively or additionally, computing device 130 may present an audio signal including a voice of user 122. As indicated above, the captured video and/or audio data may be presented in real-time (or near real-time) to allow user 132 to see and communicate with user 122, as if they were sitting across a table from each other.

The view displayed in viewing pane 910 may be coordinated with the view displayed in viewing pane 810. Accordingly, when user 122 navigates virtually within a property through viewing pane 810, viewing pane 910 may be updated to show a corresponding view. For example, if user 122 selects navigation element 812, the view displayed in viewing panes 810 and 910 may both be updated. Similarly, an interaction with viewing pane 910 by user 132 may cause the view shown in viewing pane 810 to be updated as well. Accordingly, users 122 and 132 may engage in a collaborative walkthrough of a property and may simultaneously discuss the walkthrough using user interfaces 800 and 900, respectively. In some embodiments, computing devices 120 and 130 may each access virtual tour data associated with a property from server 110. Accordingly, rather than displaying a view of viewing pane 810 in viewing pane 910 in the form of a video or similar format, viewing pane 910 may update based on navigation actions of user 122, similar to if user 132 were interacting with viewing pane 910. For example, when user 122 interacts with navigation element 812, an indication of the navigation action and/or the resulting view may be transmitted to computing device 130 (or transmitted to server 110 and conveyed to computing device 130), and computing device 130 may update viewing pane 910 to correspond to the view shown in viewing pane 810. Accordingly, system 100 may reduce the bandwidth required and provide a clearer and more responsive navigation experience than through transmitting a video feed or similar format.

In some embodiments, system 100 may restrict navigation for one or more users. For example, the system may allow one user to navigate through the property (e.g., in a navigation mode) and other users to watch the virtual tour (e.g., in a viewing mode). In the example shown in FIG. 9, viewing pane 910 may be in a viewing mode and may exclude or disable one or more navigation elements. Conversely, viewing pane 810 may be in a navigation mode, and thus may include various navigation elements, as shown in FIG. 8. In some embodiments, user interface 900 may include a control element 930, as shown in FIG. 9. Control elements 830 and 930 may allow coordination between users 122 and 132 as to which user or users are able to control navigation. In this example, control elements 830 and 930 may indicate that user 122 is controlling navigation. In some embodiments, user interfaces 800 and/or 900 may enable changing of which user can control the navigation. For example, control element 930 may include an element 932 to take or request control over the guided virtual tour. Similarly, control element 830 may include an element 832 to give control to user 132. A selection of element 932 by user 132 or a selection of element 832 by user 122 may cause viewing pane 910 to switch to a navigation mode, similar to viewing pane 810 as shown in FIG. 8. Similarly, viewing pane 810 may switch to a viewing mode, similar to viewing pane 910 as shown in FIG. 9. In some embodiments, additional steps or approval may be required prior to changing control. For example, selection of element 932 may cause a request for control to be submitted to user 122 prior to changing control. User 122 may grant the request through selecting element 832 or a similar element. Elements 832 and 932 are shown by way of example, and control may be granted or requested in various other ways. In some embodiments, control may be taken or requested through interaction with a navigation element. For example, viewing pane 910 may include various navigation elements even when in a viewing mode, and interaction with the navigation elements may cause control to be given to user 132 or may cause a request for control to be transmitted.

In some embodiments, one or more users may have different privileges than one or more other users with respect to a guided viewing event. For example, user 122 may be an agent associated with a property and/or may have generated the guided viewing event, and thus may have a higher or different level of privileges than user 132. Accordingly user 122 may initially have control over the guided viewing. Alternatively or additionally, user 122 may have other privileges, such as granting or denying control requests, determining which users are enabled to request control, muting or unmuting sound of other users, specifying whether one or more users may navigate separately from user 122 (described further below), specifying whether various navigation elements or other elements (e.g., map element 720) are included in viewing pane 910, or various other options. In some embodiments, these permissions and/or settings may be set by user 122 when scheduling a guided viewing. Alternatively or additionally, these permissions and/or settings may be changed dynamically during a guided viewing session. In some embodiments, a user may have partial control over navigation. For example, user 132 may be able to rotate a current view through interaction with viewing pane 910, but movement through various locations or waypoints within the property may be restricted to user 122 (or the user currently in control of navigation).

According to some embodiments, system 100 may allow users 122 and 132 to virtually navigate independently from each other within the property. For example, control element 930 may include an element 934 enabling user 132 to navigate independently from user 122 using viewing pane 910 accordingly, this may at least temporarily end the synchronization of views between viewing panes 810 and 910. In some embodiments, this may require approval from user 122, similar to the request for control described above. While in the independent navigation mode, viewing pane 910 may include various navigation elements (e.g., as shown in FIG. 7) to allow user 132 to navigate separately from user 122. Control elements 830 and 930 may be updated to indicate that user 132 is navigating independently. Control elements 830 and 930 may further include elements to cause viewing pane 910 to resynchronize with view 810 (or vice versa). For example, control element 930 may include an element allowing user 132 to return to a viewing mode in which viewing pane 910 is synchronized with viewing pane 810. A similar element may be displayed in control element 830, either causing viewing pane 910 to resynchronize with view 810 or vice versa. In some embodiments, while two or more users are navigating independently, viewing pane 810 and/or 910 may be updated to indicate a current view of one or more other users. For example, map element 720 may include an element 722 indicating a current view displayed in viewing pane 910, as described above. Map element 720 may further include a similar element (not shown in FIG. 9) indicating a current view displayed in viewing pane 810. Accordingly, although the views are not synchronized, users 122 and 132 may understand and visualize the current view being presented to the other user. In some embodiments, selecting the current view of another user within map element 720 may cause view 910 to "jump" or switch to the current view of the corresponding user. In some embodiments, system 100 may enable a user to highlight a particular feature or object, which may also be highlighted in a view for another user. For example, if user 132 selects feature 912 within viewing pane 910, a visual highlight (e.g., a color tint, a marker, etc.) may be displayed relative to feature 912 in viewing pane 910. Similar highlighting may also be displayed in viewing pane 810 relative to feature 912, which may allow user 132 to inquire about or comment on a specific feature.

While FIGS. 8 and 9 generally show a guided virtual walkthrough between two users, similar user interfaces may be displayed for any number of participants. For example, user interface 800 may include multiple video panes 820, each being associated with a different user participating in a guided virtual tour. Alternatively or additionally, video pane 820 may switch between different participants. For example, viewing pane 820 may display a video feed from a current or most recently active speaker, a user currently controlling navigation, a selected user, or the like. Similarly, control element 830 may include multiple elements 832, allowing user 122 to select from multiple participants to provide control to. Additional guided viewing interfaces similar to interfaces 800 and 900 may be displayed on other computing devices (e.g., an additional computing device 120 or 130, etc.).

In some embodiments, the guided viewings described herein may be scheduled guided viewings, which may help coordinate participation among two or more users. Accordingly, user interfaces 800 and 900 may be displayed as part of a scheduled guided viewing event, which may occur during a predefined time window. Accordingly, system 100 may provide an additional user interface for generating an appointment for a guided viewing event from within the dashboard. FIG. 10 illustrates an example user interface 1000 for scheduling a guided viewing event, consistent with embodiments of the present disclosure. User interface 1000 may be displayed to a user (e.g., user 122) when scheduling a guided viewing, and may be displayed on a device such as computing device 120.

As shown in FIG. 10, user interface 1000 may include various elements for specifying details about the scheduled viewing. In some embodiments, user interface 1000 may include a project selection element 1010, which may enable a user to specify a project associated with a scheduled guided viewing event. For example, a project may be a reference number or other identifier associated with a property, a group of properties, a specific transaction associated with a property (e.g., a rental, sale, etc.) or various other identifiers. A user may interact with project selection element 1010 to identify a project, which may include accessing a database of projects to select from. In some embodiments, user interface 1000 may further include an event name element 1020 allowing a user to enter a text string to represent the title of the event. Similarly, user interface 1000 may include an event description element 1040, which may allow a user to enter or otherwise specify a description associated with an event. In some embodiments, user interface 1000 may include a date and time element 1030 enabling a user to specify a time and/or duration of the event. For example, this may include a date selection element 1032 and one or more time selection elements 1034 and 1036 allowing a user to specify a date, start time, and end time of the event.

In some embodiments, system 100 may automatically generate a link 1050 for an event, which may be displayed in user interface 1000. User interface 1000 may allow user 122 to copy the link and share it with other participants of the event (e.g., user 132). User 122 may then save the event using save element 1060, which may cause the event to be generated. Once created, system 100 may automatically generate and transmit an invitation, which may include any of the information specified by the agent, including the event name, an address of the property, a date and time, or any other information. The invitation may also include a unique link to a session of the scheduled guided viewing, which participants may use to access the guided viewing. Alternatively, user 122 may cancel the event through cancel element 1062.

In some embodiments, the scheduling tool may sync with external calendars of agents or clients. For example, the scheduling tool may automatically sync with third-party calendar platforms, such as Google™ Calendar, Apple™, Outlook™, or other calendar platforms. Alternatively or additionally, the scheduling tool may provide a downloadable calendar feed (e.g., in an IDX format to sync with an existing calendar). User interface 1052 may include a calendar sharing element 1052 allowing a user to specify whether the event will be automatically extended to and synchronized with external calendars associated with the participants. In some embodiments, system 100 may automatically suggest a time for a scheduled guided viewing. For example, system 100 may access calendar information associated with user 122 and user 132 and may determine a time for the scheduled viewing event based on analysis of the first calendar information and the second calendar information. Accordingly, user interface 1000 may include one or more suggestions for times where all participants are available, which may be incorporated into date and time element 1030.

In some embodiments, system 100 may allow a user to view and/or manage various scheduled guided viewing events that he or she is invited to or otherwise associated with. Accordingly, system 100 may provide one or more user interfaces to allow an agent or other user to interact with scheduled events in various ways. For example, the interface may include interactive elements for launching a scheduled viewing, editing details about the viewing, sharing the viewing, canceling a viewing, or the like. Any changes made through the dashboard view may automatically be reflected in the events represented in third-party calendars.

Figure 11:
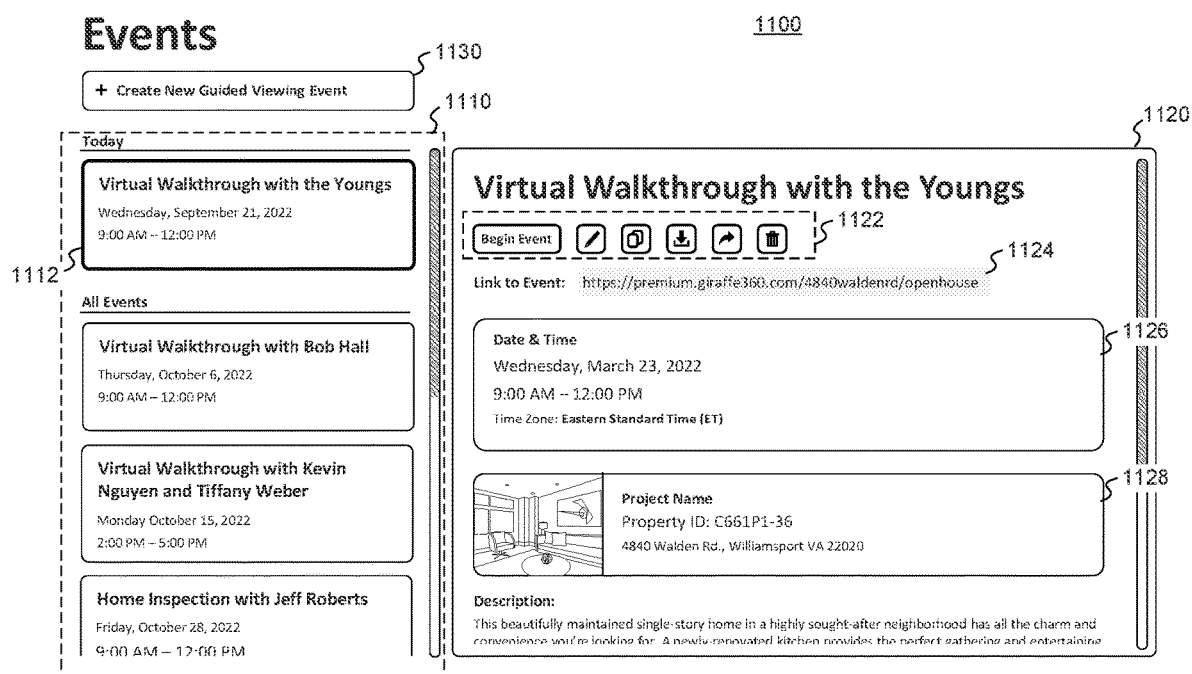
FIG. 11 illustrates an example user interface 1100 for managing guided viewing events, consistent with embodiments of the present disclosure.

FIG. 11 illustrates an example user interface 1100 for managing guided viewing events, consistent with embodiments of the present disclosure. User interface 1100 may include an event pane 1110 including representations of events a user is associated with. For example, event pane 1110 may include an event 1112, as shown in FIG. 11. The various events in event pane 1110 may be filtered, grouped, and/or sorted according to various characteristics of the event. In the example, shown in FIG. 11, events may be grouped based on whether the event occurs today and may be sorted chronologically based on a start time for the event. Various other properties or characteristics may be used to filter, group, and/or sort events, including a project associated with the event, participants in the event, a geographical region associated with a property, characteristics of a property (e.g., number of bedrooms, property type, etc.), or any other characteristics. In some embodiments, user interface 1100 may include interactive elements enabling a user to change the filtering, grouping, and/or sorting of events in event pane 1110. User interface 1100 may further include a create event element 1130, which may allow a user to create a new guided viewing event. For example, selecting create event element 1130 may cause user interface 1000 to be displayed, thereby enabling a user to create a new event.

In some embodiments, user interface 1120 may include an event detail pane 1120, which may show additional details for a selected event. In this example, event 1112 may be selected and event detail pane 1120 may provide additional details and/or options associated with event 1112. For example, event detail pane 1120 may include date and time information 1126, project information 1128, an event description, or the like. The various information displayed in event detail pane 1120 may include information input by a user when creating an event, as discussed above with respect to FIG. 10. In some embodiments, event detail pane 1120 may include a link 1124 to an event, which may correspond to link 1050 generated during the event creation process. User interface 1100 may allow a user to select and/or copy link 1124 to share an event with other users. In some embodiments, event detail pane 1120 may further include interactive elements 1122 allowing a user to perform various actions associated with an event. For example, this may include an option to begin an event, which may launch user interface 800 or 900 described above. Event detail pane 1120 may further include an edit option, which may allow a user to edit various details about an event. For example, selecting the edit option may launch user interface 1000 or a similar user interface allowing a user to modify various details of an event. Interactive elements 1122 may further include options to copy an event, download an event (e.g., as a calendar file, etc.), share an event (which may include an option to invite additional users to the event), delete an event, or various other functions associated with a scheduled guided viewing event.

Figure 12:
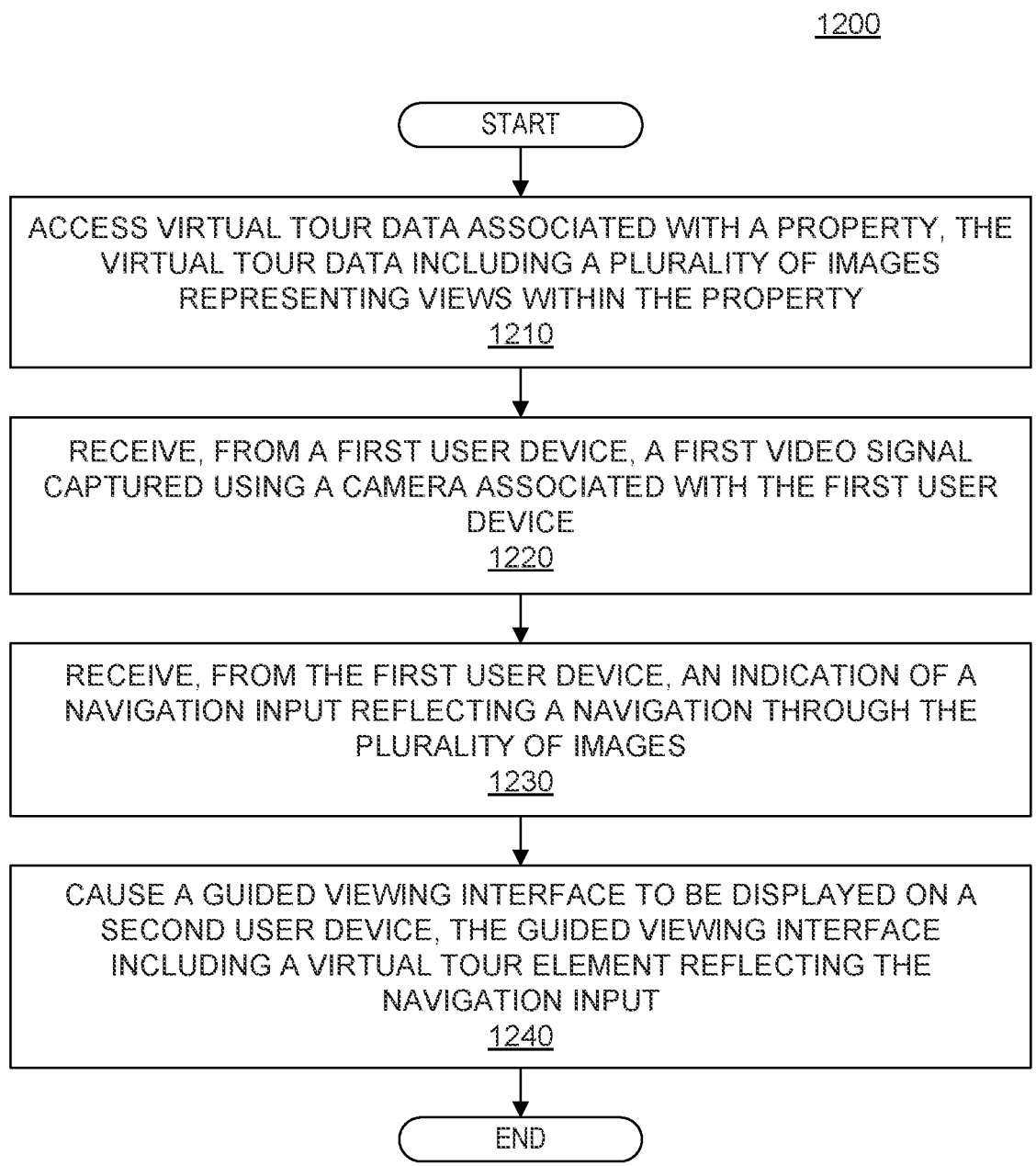
FIG. 12 is a flowchart showing an example process 1200 for synchronized presentation of a guided viewing of a property, consistent with embodiments of the present disclosure.

FIG. 12 is a flowchart showing an example process 1200 for synchronized presentation of a guided viewing of a property, consistent with embodiments of the present disclosure. In some embodiments, process 1200 may be performed by at least one processing device of a server, such as processor 210. Alternatively or additionally, some or all of process 1200 may be performed by another processing device of system 100, such as processor 310, processor 350, or processor 410. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1200. Further, process 1200 is not necessarily limited to the steps shown in FIG. 12, and any steps or processes of the various embodiments described throughout the present disclosure may also be included in process 1200, including those described above with respect to FIGS. 8, 9, 10, and 11.

In step 1210, process 1200 may include accessing virtual tour data associated with a property. As described above, virtual tour data may include a plurality of images captured within a property at various locations. For example, the virtual tour data may include image data captured at locations 610, 612 and 614 using image capture device 126, as described above. In some embodiments, image data may be processed to generate virtual tour data. For example, this processing may include adjusting image properties (e.g., brightness, contrast, color, resolution, etc.), combining or merging image data (which may include generating composite images), warping image data, upscaling or downscaling images, compressing data, or the like. This processing may occur at server 110, computing device 120, mobile device 124, or image capture device 126 (or any combination thereof).

In step 1220, process 1200 may include receiving, from a first display device, a first video signal captured using a camera associated with the first display device. The first video signal may include a plurality of images of a user of the first display device. For example, this may include a video of user 122 captured using a camera associated with computing device 120. Accordingly, the user may be an agent associated with property, as described above. In some embodiments, the first video signal includes an audio signal representing a voice of a user of the first display device captured using a microphone associated with the first display device. For example, the audio signal may be captured using a microphone associated with computing device 120.

In step 1230, process 1200 may include receiving, from the first display device, an indication of a navigation input reflecting a navigation through the plurality of images. For example, the navigation input may include an interaction with viewing pane 810 by user 122, which may be displayed by computing device 120. In some embodiments, the navigation input is based on an interaction with at least one of a progress bar or a map overlaid on the plurality of images. For example, the navigation input may include an interaction with map element 710 described above.

In step 1240, process 1200 may include causing a guided viewing interface to be displayed on a second display device. For example, this may include causing user interface 900 to be displayed on display 342 of computing device 130. The guided viewing interface may include a virtual tour element for displaying the plurality of images (which may correspond to viewing pane 910) and a video element for displaying the first video signal (which may correspond to video pane 920). As described above, the virtual tour elements of various participants may be synchronized, such that the navigational inputs of one participant may be synchronized in the virtual tour elements of other participants. Accordingly, the virtual tour element may be updated to reflect the navigation input indicated by the first display device.

In some embodiments, a similar guided viewing interface may be displayed on the first display device. Accordingly, process 1200 may further include receiving, from the second display device, a second video signal captured using a camera associated with the second display device. The second video signal may include a plurality of images of a user of the second display device. For example, this may include a video of user 132 captured using a camera associated with computing device 130. Accordingly, the user may be a prospective renter or purchaser of the property, as described above. In some embodiments, the second video signal includes an audio signal representing a voice of a user of the second display device captured using a microphone associated with the second display device. For example, the audio signal may be captured using a microphone associated with computing device 130. Process 1200 may further include causing an additional guided viewing interface to be displayed on the first display device. The guided viewing interface may include an additional virtual tour element for displaying the plurality of images representing views within the property (which may correspond to viewing pane 810) and an additional video element for displaying the first video signal (which may correspond to video pane 820). Accordingly, the indication of the navigation input may be received through an interaction with the additional virtual tour element, as described above.

According to some embodiments, navigational inputs from the second user through the second display device may be synchronized to the virtual tour element displayed on the first user. Accordingly, process 1200 may further include receiving, from the second display device, an indication of an additional navigation input through the second display device and updating the additional virtual tour element to reflect the additional navigation input. For example, this may include receiving an indication of a navigational input by user 132 using viewing pane 910 and updating viewing pane 810 to reflect the navigational input. In some embodiments, a user may request control of a guided virtual tour, as described above. Accordingly, process 1200 may include receiving a request to control of the additional virtual tour element from the second display device (e.g., using element 932) and the additional virtual tour element may be updated based on the request being granted. In some embodiments, the request may be granted based on an input received through the first display device (e.g., using element 832 or a similar element). Alternatively or additionally, control may be granted without requests from a user. For example, the first display device may enable user 122 to grant control to user 132 (e.g., using element 832 or a similar element) at his or her discretion, without receiving a request from user 132.

While the various embodiments herein are generally described using two participants, it is to be understood that a guided viewing may occur with any number of participants and/or devices. For example, process 1200 may include causing an additional guided viewing interface to be displayed on a third display device. As with the guided viewing interface displayed on the second display device, the additional guided viewing interface may include an additional virtual tour element for displaying the plurality of images and an additional video element for displaying the first video signal. The virtual tour element may be updated to reflect the navigation input.

As described above, a guided viewing event may be scheduled by one or more users. Accordingly, the guided viewing interface may be displayed during a scheduled viewing event. In some embodiments, process 1200 may further include receiving first calendar information associated with a user of the first display device; receiving second calendar information associated with a user of the second display device; and determining a time for the scheduled viewing event based on analysis of the first calendar information and the second calendar information. For example, this may include accessing calendar information associated with users 122 and 132 and determining one or more timeslots where users 122 and 132 are both available according to the calendar information. In some embodiments, the time for the scheduled viewing event may be based on a scheduling request received from at least one of the first display device or the second display device. For example, user 132 may request to have a scheduled guided viewing for a particular property within the next week, and a time for the event may be selected accordingly. In some embodiments, process 1200 may further include generating a link through which the scheduled viewing event can be accessed by the first display device and the second display device. For example, this may include generating link 1050 as described above.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer readable medium including instructions that, when executed by at least one processor, cause the at least one processor to perform operations for synchronized presentation of a guided viewing, the operations comprising:
   accessing virtual tour data associated with a property, the virtual tour data including a plurality of images representing views within the property;
   receiving, from a first display device, a first video signal captured using a camera associated with the first display device;
   receiving, from the first display device, an indication of a navigation input reflecting a navigation through the plurality of images, wherein the navigation input is based on an interaction with a map element overlaid on the plurality of images, the map element including:
      a user view element representing a position and an orientation of a current view within the property displayed on the first display device; and
      an additional user view element representing a position and an orientation of a current view associated with a user of a second display device;
   causing a guided viewing interface to be displayed on a second display device, the guided viewing interface including:
      a virtual tour element for displaying the plurality of images, the virtual tour element being updated to reflect the navigation input;
      a video element for displaying the first video signal; and
      an independent navigation element, wherein selection of the independent navigation element by the user of the second display device enables the user of the second display device to navigate through the plurality of images independent of a navigation through the plurality of images by a user of the first display device.

2. The non-transitory computer readable medium of claim 1, wherein the first video signal includes a plurality of images of a user of the first display device.

3. The non-transitory computer readable medium of claim 2, wherein the user is an agent associated with property.

4. The non-transitory computer readable medium of claim 1, wherein the first video signal includes an audio signal representing a voice of a user of the first display device captured using a microphone associated with the first display device.

5. The non-transitory computer readable medium of claim 1, wherein the operations further comprise receiving, from the second display device, a second video signal captured using a camera associated with the second display device.

6. The non-transitory computer readable medium of claim 5, wherein the second video signal includes a plurality of images of a user of the second display device.

7. The non-transitory computer readable medium of claim 6, wherein the user is a prospective renter or purchaser of the property.

8. The non-transitory computer readable medium of claim 5, wherein the second video signal includes an audio signal representing a voice of a user of the second display device captured using a microphone associated with the second display device.

9. The non-transitory computer readable medium of claim 5, wherein the operations further comprise causing an additional guided viewing interface to be displayed on the first display device, the additional guided viewing interface including:
   an additional virtual tour element for displaying the plurality of images representing views within the property; and
   an additional video element for displaying the second video signal.

10. The non-transitory computer readable medium of claim 9, wherein the operations further comprise receiving an indication of an additional navigation input through an interaction with the additional virtual tour element.

11. The non-transitory computer readable medium of claim 9, wherein the operations further include:
   receiving, from the second display device, an indication of an additional navigation input through the second display device;
   updating the additional virtual tour element to reflect the additional navigation input.

12. The non-transitory computer readable medium of claim 11, wherein the operations further include receiving a request to control the additional virtual tour element from the second display device and wherein the additional virtual tour element is updated based on the request being granted.

13. The non-transitory computer readable medium of claim 12, wherein the request is granted based on an input received through the first display device.

14. The non-transitory computer readable medium of claim 1, wherein the guided viewing interface is displayed during a scheduled viewing event.

15. The non-transitory computer readable medium of claim 14, wherein the operations further include:
receiving first calendar information associated with a user of the first display device;
receiving second calendar information associated with a user of the second display device; and
determining a time for the scheduled viewing event based on analysis of the first calendar information and the second calendar information.

16. The non-transitory computer readable medium of claim 15, wherein the time for the scheduled viewing event is based on a scheduling request received from at least one of the first display device or the second display device.

17. The non-transitory computer readable medium of claim 14, wherein the operations further include generating a link through which the scheduled viewing event can be accessed by the first display device and the second display device.

18. The non-transitory computer readable medium of claim 1, wherein the operations further comprise causing an additional guided viewing interface to be displayed on a third display device, the additional guided viewing interface including:
an additional virtual tour element for displaying the plurality of images, the virtual tour element being updated to reflect the navigation input; and
an additional video element for displaying the first video signal.

19. The non-transitory computer readable medium of claim 1, wherein the operations further comprise receiving an indication of an additional navigation input based on an interaction with a progress bar overlaid on the plurality of images.

20. The non-transitory computer readable medium of claim 1, wherein selection of the additional user view element by the user of the first display device causes the current view displayed on the first display device to update to the current view associated with the user of the second display device.

21. A system for synchronized presentation of a guided viewing, the system comprising:
at least one processor configured to:
access virtual tour data associated with a property, the virtual tour data including a plurality of images representing views within the property;
receive, from a first display device, a first video signal captured using a camera associated with the first display device;
receive, from the first display device, an indication of a navigation input reflecting a navigation through the plurality of images, wherein the navigation input is based on an interaction with a map element overlaid on the plurality of images, the map element including:
a user view element representing a position and an orientation of a current view within the property displayed on the first display device; and
an additional user view element representing a position and an orientation of a current view associated with a user of a second display device;
cause a guided viewing interface to be displayed on a second display device, the guided viewing interface including:
a virtual tour element for displaying the plurality of images, the virtual tour element being updated to reflect the navigation input;
a video element for displaying the first video signal; and
an independent navigation element, wherein selection of the independent navigation element by the user of the second display device enables the user of the second display device to navigate through the plurality of images independent of a navigation through the plurality of images by a user of the first display device.

22. A computer-implemented method for synchronized presentation of a guided viewing, the method comprising:
accessing virtual tour data associated with a property, the virtual tour data including a plurality of images representing views within the property;
receiving, from a first display device, a first video signal captured using a camera associated with the first display device;
receiving, from the first display device, an indication of a navigation input reflecting a navigation through the plurality of images, wherein the navigation input is based on an interaction with a map element overlaid on the plurality of images, the map element including:
a user view element representing a position and an orientation of a current view within the property displayed on the first display device; and
an additional user view element representing a position and an orientation of a current view associated with a user of a second display device;
causing a guided viewing interface to be displayed on a second display device, the guided viewing interface including:
a virtual tour element for displaying the plurality of images, the virtual tour element being updated to reflect the navigation input;
a video element for displaying the first video signal; and
an independent navigation element, wherein selection of the independent navigation element by the user of the second display device enables the user of the second display device to navigate through the plurality of images independent of a navigation through the plurality of images by a user of the first display device.

* * * * *